(12) United States Patent
Ohmori

(10) Patent No.: US 7,373,025 B2
(45) Date of Patent: May 13, 2008

(54) WAVEGUIDE-TYPE OPTICAL DEVICE

(75) Inventor: Yasuhiro Ohmori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/712,451

(22) Filed: Mar. 1, 2007

(65) Prior Publication Data
US 2007/0286545 A1     Dec. 13, 2007

(30) Foreign Application Priority Data
Mar. 30, 2006  (JP)  ............................. 2006-092979

(51) Int. Cl.
*G02F 1/035*    (2006.01)
(52) U.S. Cl. .......................................... 385/2; 385/45
(58) Field of Classification Search .............. 385/2, 385/45
See application file for complete search history.

(56) References Cited

U.S. PATENT DOCUMENTS

| | | | |
|---|---|---|---|
| 2002/0018507 A1* | 2/2002 | Deacon | 372/96 |
| 2004/0156591 A1* | 8/2004 | Zheng et al. | 385/45 |
| 2005/0157970 A1* | 7/2005 | Sugamata et al. | 385/2 |
| 2005/0271313 A1 | 12/2005 | Oikawa et al. | |
| 2006/0120654 A1 | 6/2006 | Aoki et al. | |
| 2007/0280578 A1* | 12/2007 | Glebov et al. | 385/2 |

FOREIGN PATENT DOCUMENTS

| | | |
|---|---|---|
| EP | 1 258 772 | 11/2002 |
| JP | 11-295675 | 10/1999 |
| JP | 2000-266951 | 9/2000 |
| JP | 2004-219521 | 8/2004 |
| WO | 2005/029165 | 3/2005 |

OTHER PUBLICATIONS

Extended European Search Report issued in European Patent Application No. 07005365.7-2205, mailed on Jun. 1, 2007.

* cited by examiner

*Primary Examiner*—Ellen E. Kim
(74) *Attorney, Agent, or Firm*—Staas & Halsey LLP

(57) ABSTRACT

In the present invention, for example with regards to a Mach-Zehnder type LN modulator which uses a Z-cut LN substrate, by providing a step by forming an etching part on the surface of the LN substrate, and forming an optical waveguide so as to position a pair of branching waveguides of a Mach-Zehnder interferometer in the step portion, a height difference is produced between the branching waveguides, in the perpendicular direction to the substrate surface. As a result, lines of electric force directed from a signal electrode provided above one branching waveguide towards a ground electrode provided above an other branching waveguide are hardly dispersed, and a desired electro-optic effect can be obtained at a lower drive voltage.

16 Claims, 17 Drawing Sheets

TOP VIEW

X-X' CROSS-SECTION

OPTICAL WAVEGUIDE ARRANGEMENT VIEWED FROM Y-DIRECTION

LINES OF ELECTRIC FORCE

TOP VIEW

X-X' CROSS-SECTION

TOP VIEW

X-X' CROSS-SECTION

X-X' CROSS-SECTION

TOP VIEW

X1-X1' CROSS-SECTION

X2-X2' CROSS-SECTION

OPTICAL WAVEGUIDE ARRANGEMENT VIEWED FROM Y-DIRECTION

TOP VIEW

X-X' CROSS-SECTION

TOP VIEW

TOP VIEW

X-X' CROSS-SECTION

TOP VIEW

X-X' CROSS-SECTION

TOP VIEW

X-X' CROSS-SECTION

TOP VIEW

X-X' CROSS-SECTION

WAVEGUIDE-TYPE OPTICAL DEVICE

BACKGROUND OF THE INVENTION

1. Field of the Invention

The present invention relates to a waveguide-type optical device using an electro-optic effect, and in particular, relates to a waveguide-type optical device in which an electric field acts on a pair of optical waveguides formed near a surface of a dielectric substrate, in a direction substantially perpendicularly to the substrate.

2. Description of the Related Art

Crystals having the electro-optic effect, particularly ferroelectric crystals such as lithium niobate (LiNbO$_3$:LN), have been applied to many optical devices such as optical modulators, optical switches, and optical attenuators, due to their high electro-optic constant. For example, an LN modulator used in large-capacity, high-speed communication is advantageous from the standpoint of small wavelength chirp, as compared with a modulator having a configuration in which a light source is directly modulated, or an electro-absorption modulator integrated laser diode (EML).

Specifically, as a conventional LN modulator, for example as shown in FIG. 16 to FIG. 18, a variable chirp configuration in which a Z-cut LN substrate is used to form a dual-drive type electrode (FIG. 16), a fixed chirp configuration in which a Z-cut LN substrate is used to form a single-drive type electrode (FIG. 17), and a zero chirp configuration in which an X-cut LN substrate is used to form a single-drive type electrode (FIG. 18) are known (see for example, Japanese Unexamined Patent Publication No. 2004-219521, paragraph numbers 0002 to 0003). Reference numeral 101 in each figure denotes an LN substrate, 110 denotes a Mach-Zehnder optical waveguide, 121 denotes a signal electrode, 122 denotes a ground electrode, and 130 denotes a buffer layer.

It has been reported that, among the above described various configurations, the single-drive type LN modulator is user-friendly, and particularly, the chirp type LN modulator (FIG. 17) with chirps of a required amount, is advantageous in long-distance optical transmission, and this is widely used in long-distance, large-capacity optical transmission systems.

However, the above LN modulators have a larger voltage at the time of operation than that of the aforementioned direct modulation method and the EML, and hence, it is a problem to achieve low voltage (improvement of modulation efficiency) from the standpoint of power consumption and drive amplitude of a driver circuit. This problem is not only in the LN modulator, but is common to various types of waveguide-type optical devices using a substrate having the electro-optic effect.

The waveguide-type optical device having the single-drive type electrode structure using the Z-cut substrate as shown in FIG. 17 is specifically explained. As shown in the X-X' cross-section in FIG. 19, relative to two optical waveguides formed approximately parallel with each other with a necessary distance therebetween near the surface of the Z-cut substrate, a signal electrode is arranged above one of the optical waveguides and a ground electrode is arranged above the other optical waveguide. In such an electrode structure, an electric field acting on the respective optical waveguides becomes substantially perpendicular to the substrate surface. Curved arrows in FIG. 19 indicate lines of electric force between the signal electrode and the ground electrode. As seen from the state of these lines of electric force, in the single-drive type electrode structure using the Z-cut substrate, the lines of electric force are likely to be dispersed, and in order to obtain a desired electro-optic effect, a relatively high drive voltage needs to be applied to the signal electrode.

SUMMARY OF THE INVENTION

In view of the above situation, it is an object of the present invention to realize a new structure of the waveguide-type optical device in which a pair of optical waveguides and a pair of electrodes are formed on a substrate having the electro-optic effect, which can reduce the drive voltage.

To achieve the above object, in one aspect of the waveguide-type optical device of the present invention, the waveguide-type optical device is provided with; a substrate having an electro-optic effect, a first optical waveguide and a second optical waveguide, being a pair of optical waveguides formed on one face of the substrate, a first electrode provided above the first optical waveguide, and a second electrode provided above the second optical waveguide, and a distance between an other face of the substrate opposite to the one face and said first optical waveguide is different from said other face of said the substrate and the second optical waveguide.

In the waveguide-type optical device having such a configuration, since the distance from the other face of the substrate opposite to the one face is different for the first optical waveguide and the second optical waveguide, a height difference is given to the pair of optical waveguides. As a result, a state in which the lines of electric force formed between the first and the second electrodes are hardly dispersed can be realized, as compared with the configuration in which the pair of optical waveguides is formed at the same height.

In another aspect of the waveguide-type optical device of the present invention, the waveguide-type optical device is provided with; a substrate having the electro-optic effect, a first optical waveguide and a second optical waveguide, being a pair of optical waveguides formed on one face of the substrate, a first electrode provided above the first optical waveguide, and a second electrode provided above the second optical waveguide, and the first optical waveguide is formed near a first face, which is a part of the one face, and the second optical waveguide is formed near a second face, which is a part of the one face, and a distance from the other face of the substrate opposite to the one face is different for the first face and the second face.

In such a configuration, due to a difference in level of the one face (between the first face and the second face) of the substrate, a height difference is given between the first and the second optical waveguides formed near the respective faces. As a result, a state in which the lines of electric force formed between the first and the second electrodes are hardly dispersed can be realized, as compared with the configuration in which the pair of optical waveguides is formed at the same height.

Furthermore, a specific configuration of the waveguide-type optical device as described above may be such that there is provided a Mach-Zehnder optical waveguide formed on the substrate, and the Mach-Zehnder optical waveguide has an input waveguide, a branching part for branching light input to the input waveguide into two, a first branching waveguide through which one of the lights branched by the branching part propagates, a second branching waveguide through which the other of the lights branched by the branching part propagates, a coupling part which couples respective lights having propagated through the first and second branching waveguides, and an output waveguide through which the light coupled by the coupling part propagates, and the first and second branching waveguides correspond to the pair of optical waveguides.

In the waveguide-type optical device having such a configuration, the light input to the input waveguide of the Mach-Zehnder optical waveguide is branched into two by the branching part, and respectively sent to the first and the second branching waveguides. The electric field generated between the first and second electrodes acts on the respective branching waveguides, and a phase of the lights propagating in the respective branching waveguides changes due to a change of refractive index of the respective branching waveguides by the electro-optic effect due to the electric field. Since the lights propagating in the respective branching waveguides are coupled by the coupling part, an intensity-modulated optical signal is output from the output waveguide.

According to the waveguide-type optical device of the present invention, the drive voltage required for obtaining the desired electro-optic effect can be reduced. Moreover, if it is assumed that the drive voltage is maintained constant, a length required for interaction between the light propagating in the optical waveguides and an electric signal propagating in the electrodes can be reduced. Accordingly, for example, when optical modulation is performed, modulation efficiency can be improved, and wideband modulation can be performed.

Other objects, features, and advantages of the present invention will become apparent from the following description of the embodiments, in conjunction with the accompanying drawing.

DESCRIPTION OF THE PREFERRED EMBODIMENTS

Best modes for implementing the present invention will be described with reference to the accompanying drawings. Throughout the figures, like reference symbols denote the same or equivalent parts.

Figure 1:
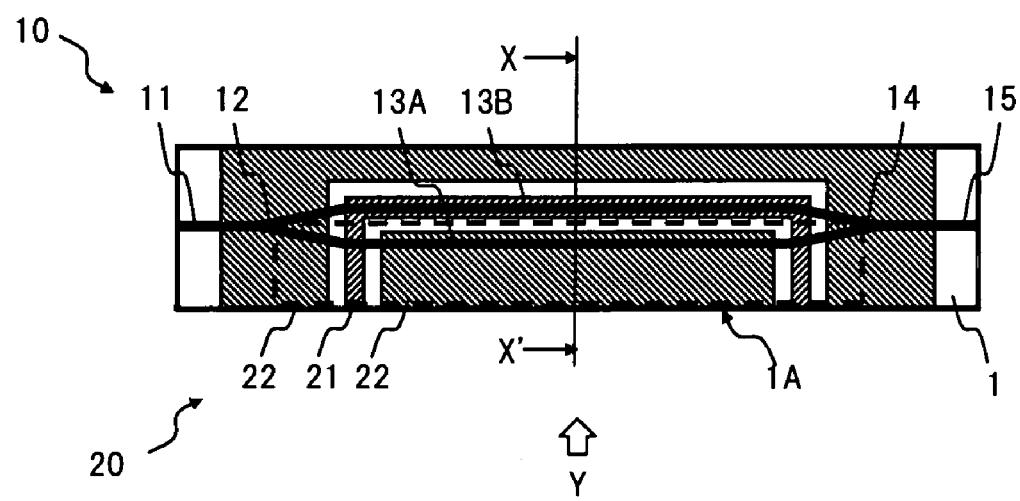
FIG. 1 is a block diagram of a first embodiment of a waveguide-type optical device according to the present invention.
Figure 1:
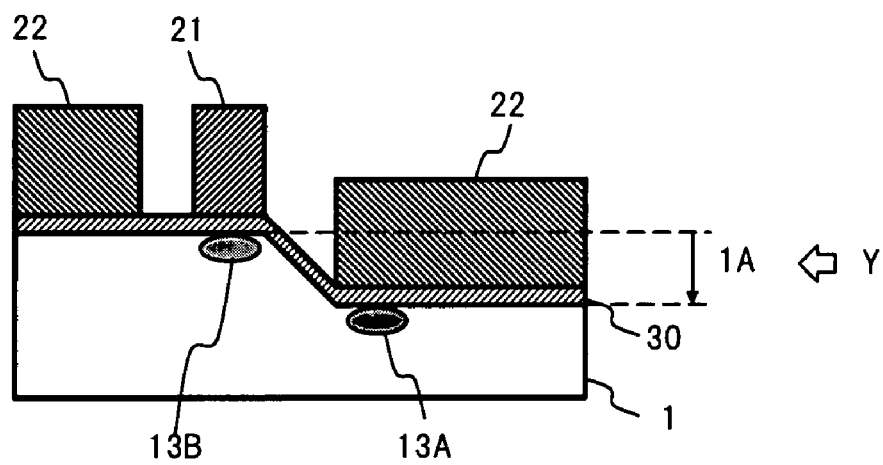

FIG. 1 is a block diagram of a first embodiment of a waveguide-type optical device according to the present invention.

In FIG. 1, the waveguide-type optical device according to the first embodiment, is one where the present invention is applied to an LN modulator having a single-drive type electrode structure using the conventional Z-cut substrate. The LN modulator comprises: a Mach-Zehnder optical waveguide 10 including a Z-cut LN substrate 1, an input waveguide 11, a branching part 12, branching waveguides 13A and 13B, a coupling part 14, and an output waveguide 15; a drive electrode 20 including a signal electrode 21 and a ground electrode 22; and a buffer layer 30 formed between the surface of the LN substrate 1 and the drive electrode 20.

Figure 2:
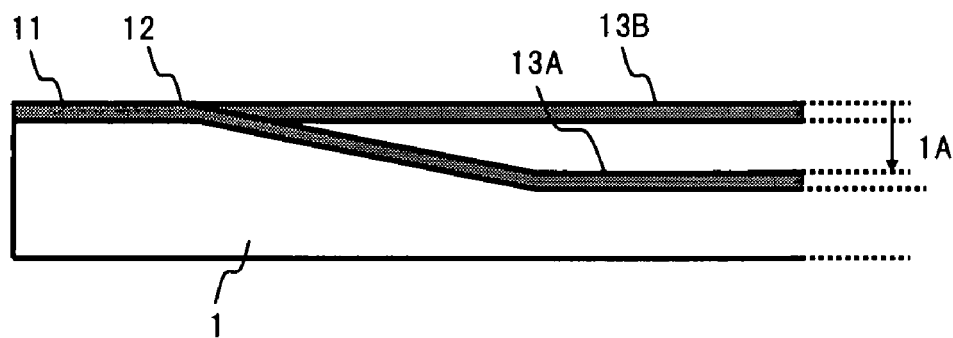
FIG. 2 is a schematic diagram showing an arrangement of optical waveguides, when the configuration of FIG. 1 is seen from the Y-direction.
Figure 2:
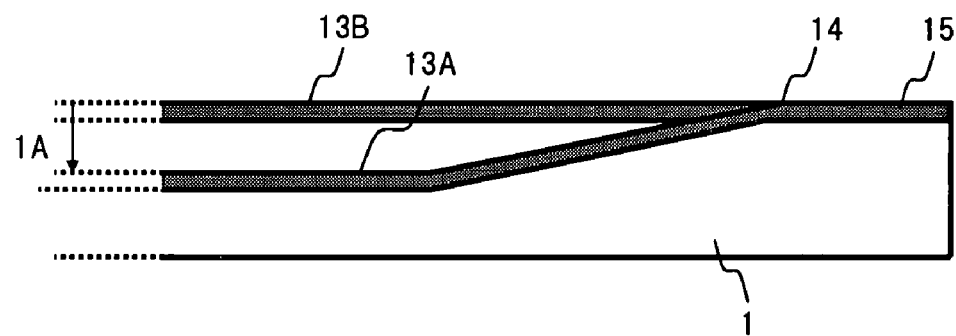

The LN substrate 1 has an etching part 1A in which the height of one face (surface) of the substrate is made different from the height of other parts, in a preset portion positioned near the branching waveguide 13A of the optical waveguide 10 (a range enclosed by the broken line in the top view shown in the upper part of FIG. 1). In the first embodiment, the part excluding the etching part 1A, of the surface of the substrate, becomes the first face (the face on an upper stage), and the part corresponding to the etching part 1A becomes the second face (the face on a lower stage). As shown in the X-X' cross-section shown in the lower part of FIG. 1, the etching part 1A gives a difference in level to the respective branching waveguides 13A and 13B formed near the surface of the LN substrate 1. Here, the difference in level is provided so that the height of the branching waveguide 13A on which the ground electrode 22 is arranged, becomes lower than that of the branching waveguide 13B on which the signal electrode 21 is arranged. The etching part 1A has a slope shape at one end located on the branching part 12 side such that the difference in level gradually increases from the branching part 12 toward one end of the branching waveguide 13A, so that optical paths can be connected between the branching part 12 and the branching waveguide 13A lower than the branching part 12 with a small loss. Moreover, at the other end located on the coupling part 14 side, the etching part 1A also has a slope shape such that the difference in level gradually decreases from the other end of the branching waveguide 13A toward the coupling part 14, so that optical paths can be connected between the branching waveguide 13A and the coupling part 14 higher than the branching waveguide 13A with a small loss. FIG. 2 is a schematic diagram showing the difference in level of the surface of the substrate 1, when the configuration of FIG. 1 is viewed from the Y-direction following along the waveguide. The slope shape at the opposite end portions of the etching part 1A is shown in an enlarged scale.

In the optical waveguide 10, the input waveguide 11, the branching part 12, the branching waveguides 13A and 13B, the coupling part 14, and the output waveguide 15 constituting the Mach-Zehnder interferometer, are formed near the surface of the substrate, by applying known processing such as titanium (Ti) diffusion with respect to the LN substrate 1 provided with the above etching part 1A. The branching waveguide 13A has a height one step lower than the other waveguide parts relative to the perpendicular direction of the substrate, as described above, due to the etching part 1A of the LN substrate 1.

Figure 9:
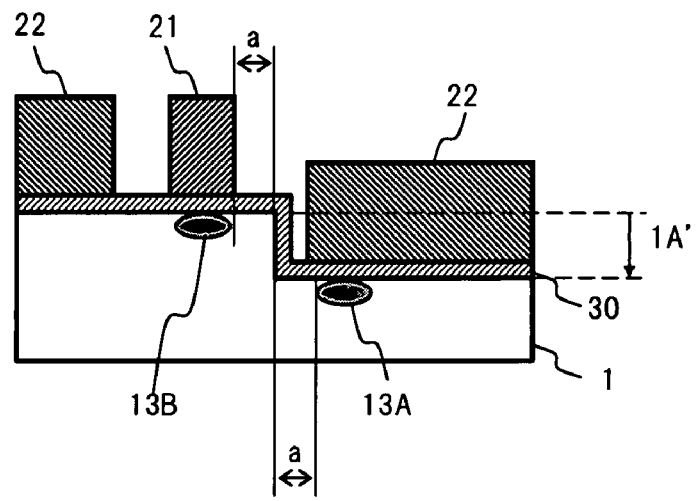
FIG. 9 is a cross-section of modified examples of the waveguide-type optical devices shown in FIG. 1, FIG. 7, and FIG. 8.
Figure 9:
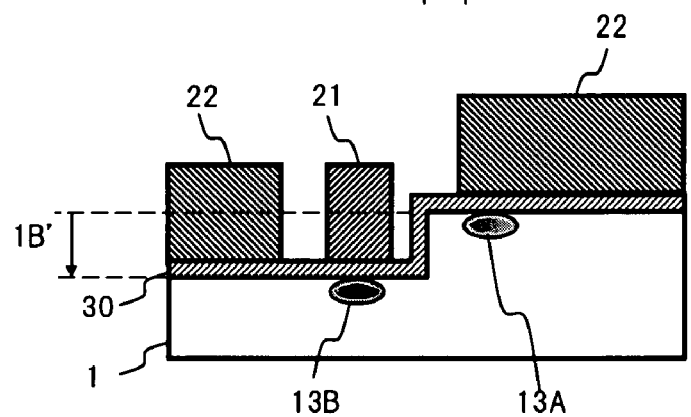
Figure 9:
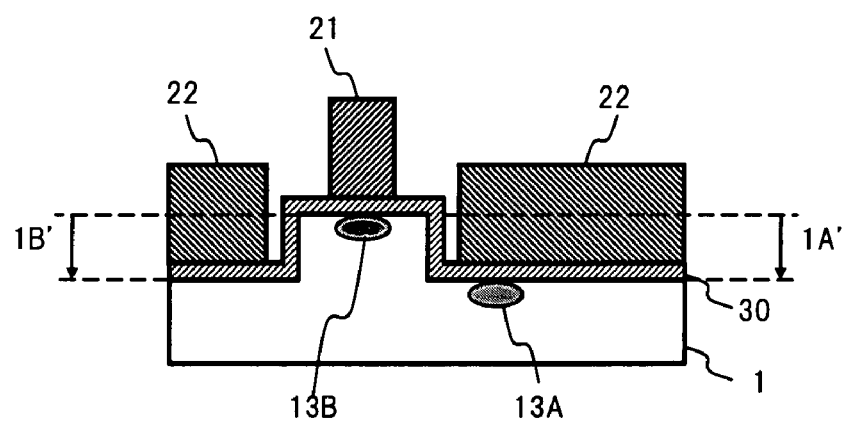

A configuration example in which a ridge-type waveguide is formed on a substrate is shown in paragraph number 0005 of the above described Patent Document (Japanese Unexamined Patent Publication No. 2004-219521) and in FIG. 9 of Japanese Unexamined Patent Publication No. 2000-266951, and the substrate also has a step structure on the surface thereof. However, in the step structure of the substrate in the conventional configuration, a difference in level is formed on the surface of the substrate as a result of shaving the substrate portion positioned at the opposite ends of the optical waveguide for realizing the ridge-type waveguide, and is essentially different from the step structure of the substrate formed so as to differentiate the vertical height of the pair of waveguides formed in the substrate, as in the present invention.

In the drive electrode 20, a signal electrode 21 and a ground electrode 22 are formed on the surface of the LN substrate 1 via the buffer layer 30. The signal electrode 21 is here patterned so as to follow along the branching waveguide 13B. A drive current supplied from a drive circuit (not shown in the figure) is applied to one end of the signal electrode 21. The ground electrode 22 is formed on approximately the whole surface of the LN substrate 1 separated by a fixed distance to the signal electrode 21.

The buffer layer 30 is for preventing light propagated in the optical waveguide 10 from being absorbed by the drive electrode 20, and is generally a layer comprising for example oxide silicon ($SiO_2$) or the like.

Figure 3:
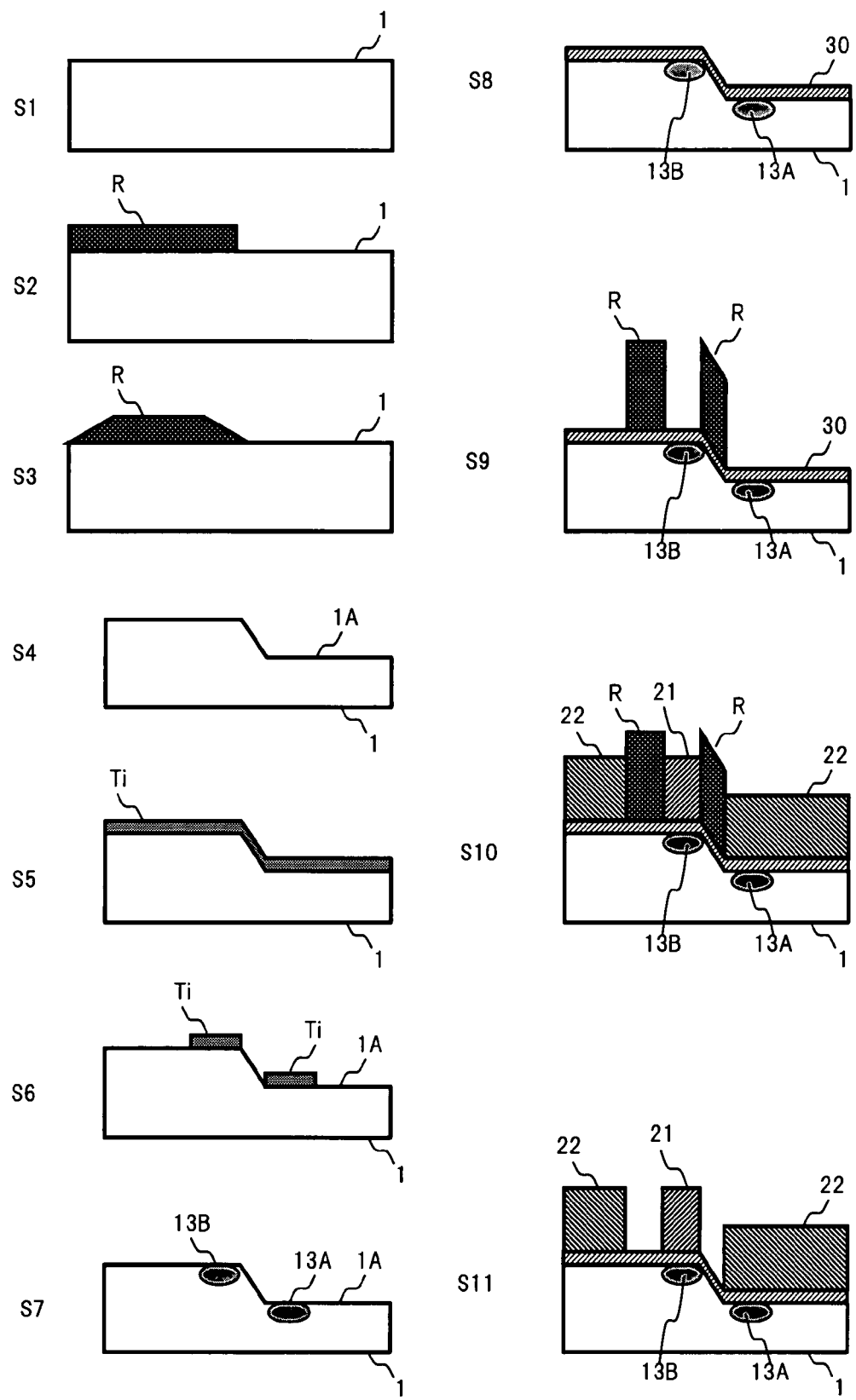
FIG. 3 is a process chart illustrating one example of a manufacturing method in the first embodiment.

Here an example of a production method for the LN modulator provided with the step configuration as described above, is explained with reference to the process chart shown in FIG. 3.

Generally, the distance of a pair of branching waveguides in the Mach-Zehnder type LN modulator also depends on the mode field which propagates the light, and is approximately 10 μm to 20 μm. Processing the LN substrate 1 so as to form a step approximately equal to this on the surface, can be easily performed using an existing process technique such as for example dry etching. Therefore, on the surface of a previously prepared LN substrate 1, a photoresist R is formed on a portion except for the portion to form the etching part 1A (S1 and S2 of FIG. 3). This photoresist is used as a mask when forming the etching part 1A by dry etching.

Here if there is a sharp step on the boundary portion of the etching part 1A, the optical waveguide formed in the vicinity thereof is likely be cut. Therefore the surface of the boundary portion of the etching part 1A is preferably made a slope having a certain incline. As one method for forming the region of the step with an incline, here the photoresist R is baked, and the shrinkage effect of the resist R is used to give a desired slope on the mask end face (S3). The bake temperature at this time is optimized corresponding to the used resist material, and the baking technique which uses a hot plate or an oven or the like.

Then, dry etching of the LN substrate 1 is performed, with the resist R formed with the slope as the mask. The etching amount (difference in level of the substrate surfaces) also depends on the mode field of the optical waveguide, however this is suitably around 5 μm to 20 μm. However, the difference in level of the substrate surfaces in the present invention, is not limited to the abovementioned example, and here this can be optionally set within a range in which the light propagating on the respective branching waveguides 13A and 13B does not interact. At this time, if the selection ratio of the resist R and the LN substrate 1 is commensurable, the etching part 1A having the incline face traced with the shape of the mask end face in the boundary portion is formed (S4). The incline of the mask end face positioned on the side opposite to the etching part 1A is also traced on the LN substrate 1, however, this portion is cut off. In the above description, the selection ratio for the substrate and the mask at the time of dry etching is made approximately the same, however by adjusting this selection ratio, the incline angle of the boundary surface of the etching part 1A can also be optimized.

The above described inclination angle corresponds to the boundary portion (third surface) of the etching part 1A positioned between the branching waveguides 13A and 13B. The slope shape of the boundary portion on the branching part 12 side mentioned above, and the coupling part 14 side is preferably made as gradual as possible from the aspect of decreasing the insertion loss. Also for such a gradual incline, this can be made to correspond by optimizing the resist material or baking temperature, and the selection ratio at the time of dry etching. Furthermore, a later described forming method using a metal mask obtained by performing lift off may be applied.

Next a titanium (Ti) layer which becomes the optical waveguide 10, is deposited on the surface of the LN substrate 1 on which the etching part 1A is formed as described above (S5). Then, the pattern is matched so that the two branching waveguides 13A and 13B which constitute the Mach-Zehnder interferometer, are positioned on portions having the difference in level on the substrate surface, and etching of the Ti layer is performed (S6). When etching the Ti layer to a desired pattern, thermal diffusion processing of the Ti layer is performed, and a Mach-Zehnder type optical waveguide 10 is formed near the surface of the LN substrate 1 (S7).

Once the forming of the optical waveguide 10 on the LN substrate 1 is complete, the buffer layer 30 is formed on the surface of the LN substrate 1 which is applied with the difference in level (S8). Then, a patterning process of the resist R is performed in order to form the signal electrode 21 and the ground electrode 22 on the buffer layer 30 (S9), and gold (Au) plating is applied on the buffer layer 30, with the resist as a mask (S10), and the resist R is then removed (S11). As a result, a drive electrode 20 of a predetermined pattern is formed with a signal electrode 21 arranged above the branching waveguide 13B, and a ground electrode 22 arranged above the branching waveguide 13A. An LN modulator having the etching part 1A as shown in FIG. 1 is then manufactured using an existing process technique.

Figure 4:
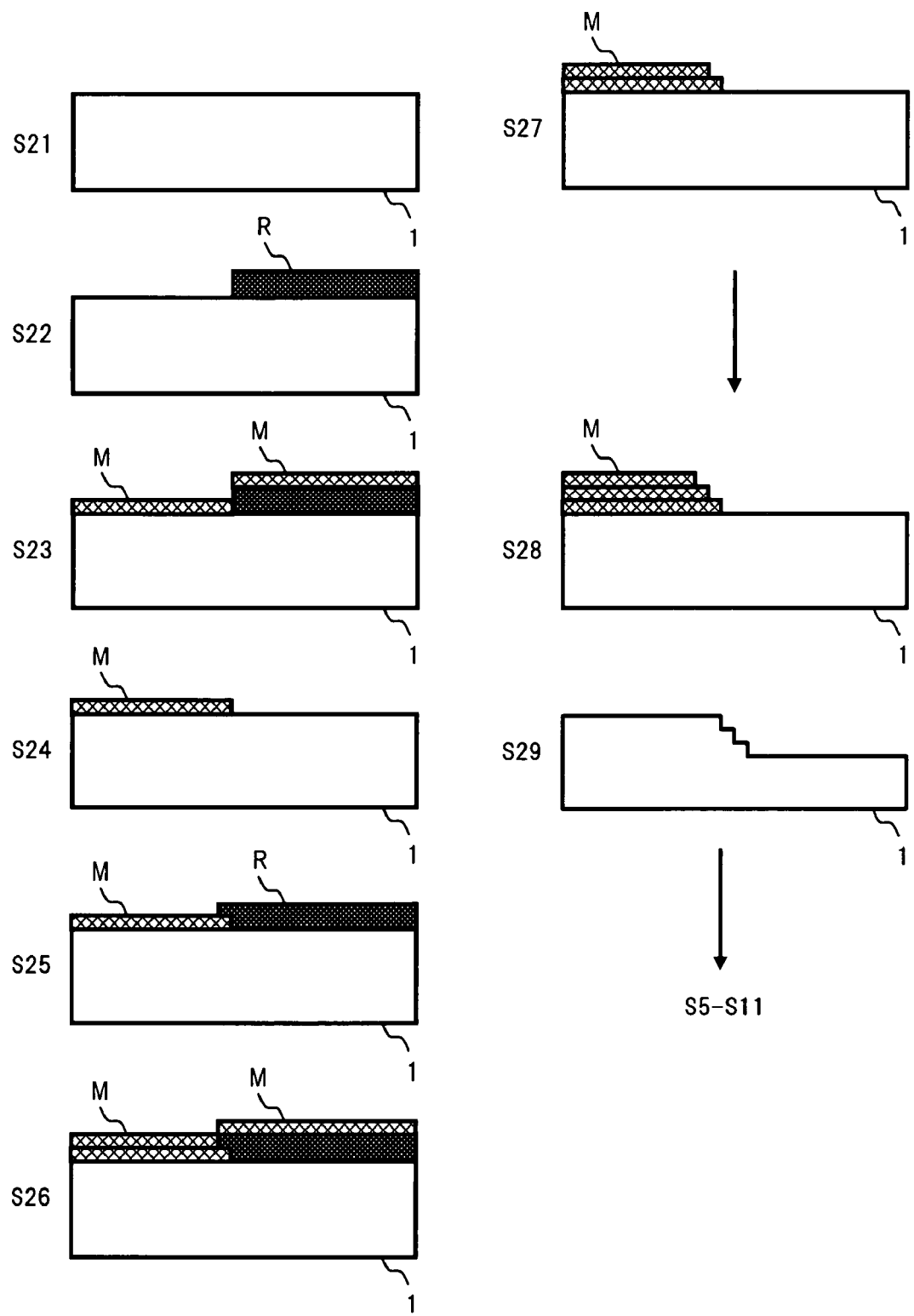
FIG. 4 is a process chart illustrating another example of the manufacturing method in the first embodiment.

In the abovementioned processing step, as the method of forming the boundary portion of the etching part 1A at an incline, the example is given where the shrinkage effect of the photoresist R due to the baking process is used. However as another forming method, it is also possible to apply a method which uses lift off such as shown for example in the process chart of FIG. 4. More specifically, resist R is formed on a portion which forms the etching part 1A on the surface of a previously prepared LN substrate (S21, S22 in FIG. 4). Then, after depositing a metal layer M which becomes the mask for the dry etching (S23), unwanted portions are removed by lift off, to obtain a desired metal mask (S24). For the metal layer M, normally chrome (Cr) or the like is used.

Next, resist R is again applied, and after patterning the resist R so that the pattern shifts in the direction to form the incline face (S25), deposition of the metal layer M (S26) and lift off (S27) are performed. By performing this repeatedly, a metal mask M having an end face of a step shape is formed (S28). Then, by performing dry etching of the LN substrate 1 using this metal mask M, an etching part 1A having an incline face traced with the shape of the metal mask M in the boundary portion is formed (S29). After forming the etching part 1A on the LN substrate 1, processes the same as for the aforementioned steps S5 to S11 shown in FIG. 3 are performed.

Next is a description of the operation of the first embodiment.

In the LN modulator of the structure as described above, continuous light applied from the outside to the input waveguide 11 is branched into two by the branching part 12, and respectively sent to the branching waveguides 13A and 13B. The electric field generated between the signal electrode 21 and the ground electrode 22 acts on the respective branching waveguides 13A and 13B, corresponding to a drive signal applied to one end of the signal electrode 21, and the refractive index of the branching waveguides 13A and 13B changes due to the electro-optic effect due to the electric field. As a result, the phase of the respective lights propagating on the branching waveguides 13A and 13B respectively change, and by combining these lights in the coupling part 14, an optical signal which is intensity modulated is output from the output waveguide 15 to the outside.

Figure 5:
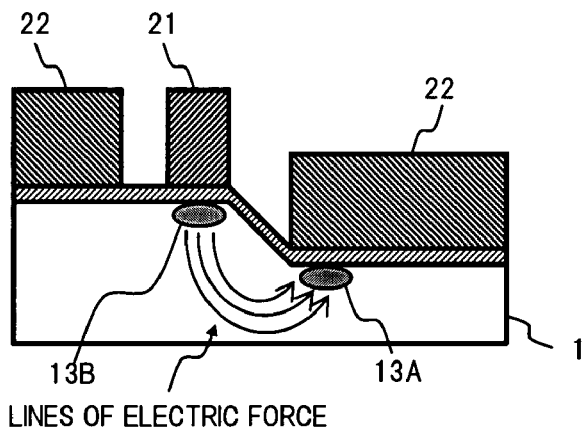
FIG. 5 depicts a state of lines of electric force in the first embodiment.
Figure 19:
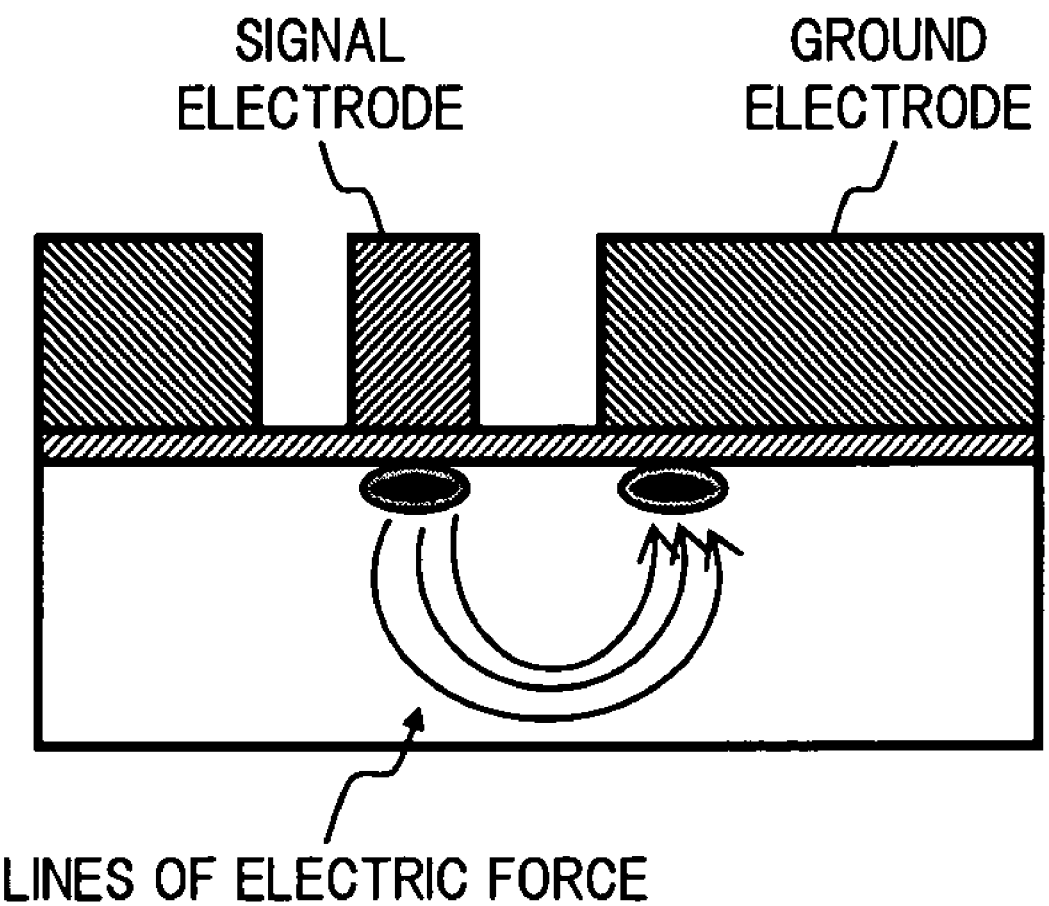
FIG. 19 depicts a state of lines of electric force in a conventional LN modulator.

At this time, the lines of electric force directed from the signal electrode 21 positioned above the branching waveguide 13B towards the ground electrode 22 which is positioned above the branching waveguide 13A, become the state as shown for example by the curved arrows in FIG. 5. This state is one where the lines of electric force are hardly dispersed, compared to the case of the aforementioned conventional configuration shown in FIG. 19, that is the configuration where the pair of branching waveguides are arranged at the same height.

Consequently, according to this LN modulator, the drive voltage necessary in order to obtain the desired electro-optic effect can be made lower than with the conventional configuration. Therefore, it is possible to achieve an improvement in the modulation efficiency. Furthermore, in the present LN modulator, in the case where the drive voltage is maintained at a value the same as heretofore, the length of the portion where the light and the electric signal interact (interaction length) can be made shorter than heretofore. As a result, attenuation of the drive signal propagated on the signal electrode 21, more specifically, the high frequency electrical signal corresponding to the transmission bit rate (for example microwaves and the like) becomes small, and hence it is possible to perform wider band modulation.

Figure 6:
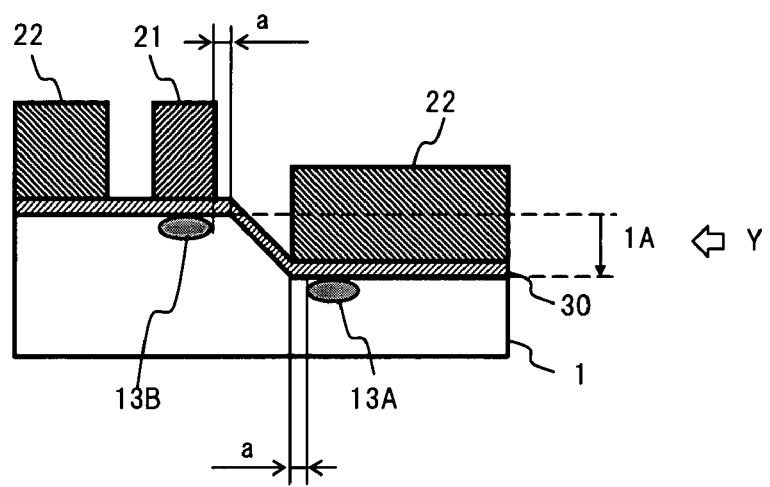
FIG. 6 is a diagram for explaining a difference in level and distance between the optical waveguides in the first embodiment.

Furthermore, regarding the diffusion waveguide which uses the LN substrate 1 which is a ferroelectric substance, there is a tendency for the mode field of a cross-section perpendicular to the propagation direction of the light to become larger towards the transverse direction parallel with the substrate surface (refer to the lower part of FIG. 1 or FIG. 5). In the present LN modulator, since the branching waveguides 13A and 13B having a widening in the transverse direction, are arranged displaced in the vertical direction, then compared to the conventional case where the respective branching waveguides are arranged at the same height, this gives a configuration where the light propagated on the branching waveguides 13A and 13B hardly interacts, and an improvement effect in the extinction ratio of the output light can also be expected. As shown in FIG. 6, regarding the distance "a" from the edge of the step of the substrate surface to the optical waveguide, from the aspect of the modulation efficiency, "a"=0 is desirable, however due to the mode field of the optical waveguide, there is concern of losses occurring. In order to reduce the loss at the step, in the case where the mode field is large, the distance "a" must be made large, while in the case where the mode field is small, the distance "a" can be small. However, in order to optimize the mode field taking into consideration the excitation of the multimode, or the joint losses with the optical fiber, and the modulation efficiency, the distance "a" must be determined appropriately corresponding to the required characteristics.

In addition, by making the gradual slope shape between the branching part 12 and the one end of the branching waveguide 13A, and between the other end of the branching waveguide 13A and the coupling part 14, the connection of the optical path reaching from the branching part 12 to the coupling part 14 via the branching waveguide 13A can be performed with low loss. Therefore, by providing the etching part 1A and reducing the drive voltage, the fluctuations in the power of the propagation light on the respective branching waveguides 13A and 12B can be suppressed, and good modulation characteristics can be maintained.

Figure 7:
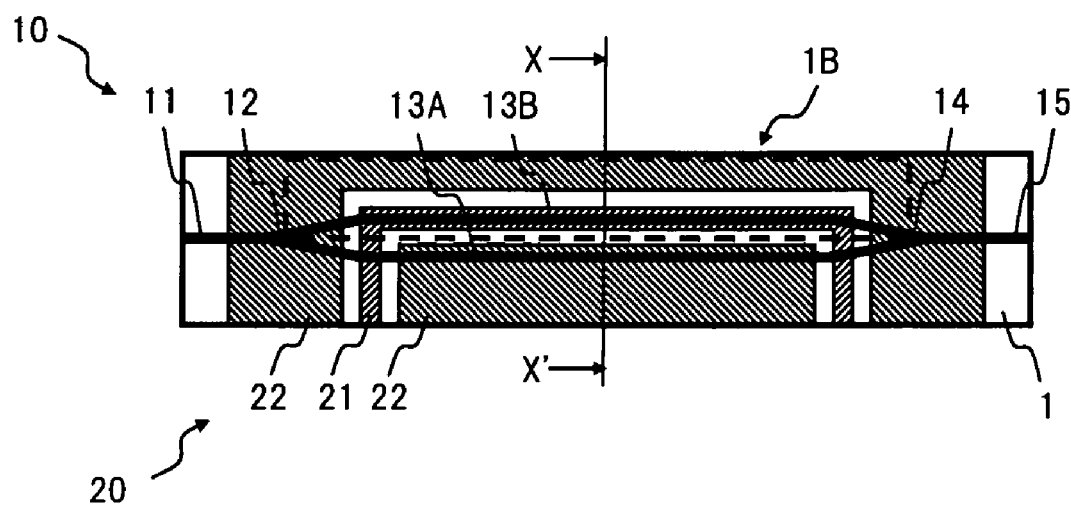
FIG. 7 is a block diagram of another configuration example of the first embodiment.
Figure 7:
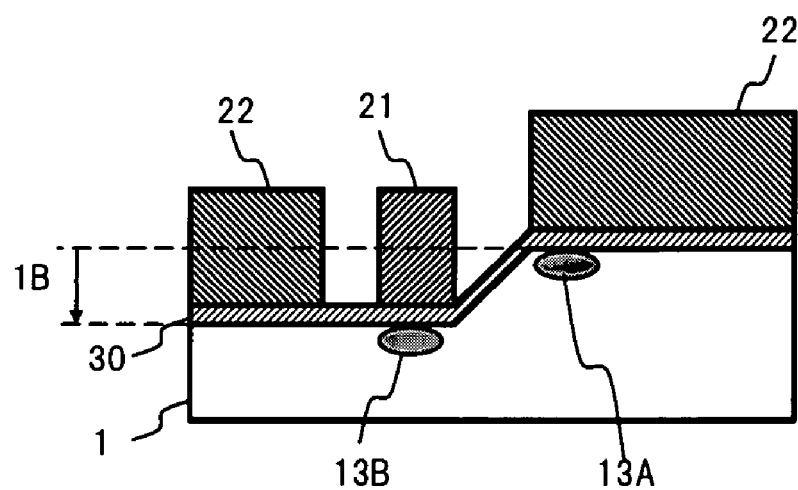

In the abovementioned first embodiment, the example is shown where the etching part 1A is provided so that the position of the branching waveguide 13A on which the ground electrode 22 is arranged, is lower than the position of the branching waveguide 13B on which the signal electrode 21 is arranged. However instead of the etching part 1A, the configuration may of course be such that an etching part 1B is provided as shown in FIG. 7, so that the position of the branching waveguide 13B becomes lower than the position of the branching waveguide 13A. Furthermore, as shown for example in FIG. 8, the etching parts 1A and 1B may be provided on a portion located on opposite sides of the branching waveguide 13B. In such a configuration, not only the lines of electric force from the signal electrode 21 towards the ground electrode 22 above the branching waveguide 13A are hardly dispersed, but also the lines of electric force from the signal electrode 21 towards the ground electrode 23 on the opposite side to the branching waveguide 13A are hardly dispersed. Therefore a desired electro-optic effect can be obtained at a lower drive voltage.

Furthermore, in the abovementioned first embodiment, the example was shown for where the boundary portion of the etching part 1A positioned between the etching parts 1A and 1B was made so as to become an incline face. However depending on the mode field of the optical waveguide, in order to increase the modulation efficiency with a slight sacrifice to losses, then for example as shown in FIG. 9, an approximately perpendicular boundary face may be formed.

Figure 8:
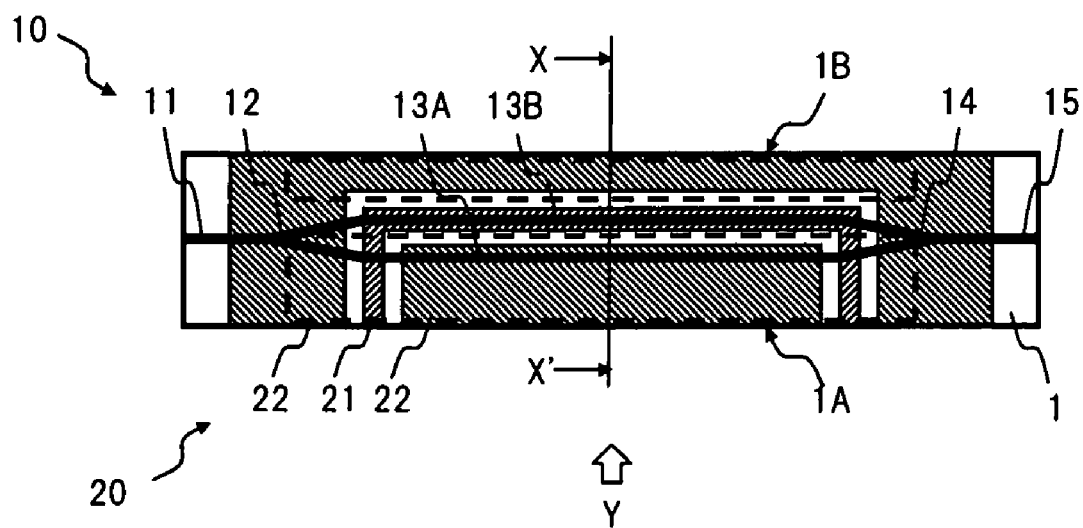
FIG. 8 is a block diagram of yet another configuration example of the first embodiment.
Figure 8:
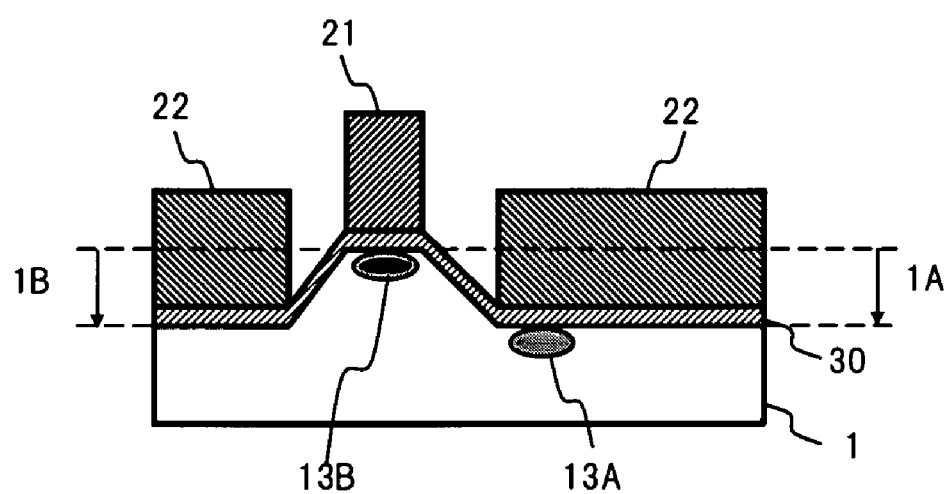

The upper part of FIG. 9 corresponds to the configuration of FIG. 1, the center part corresponds to the configuration of FIG. 7, and the lower part corresponds to the configuration of FIG. 8. In such a configuration where the step is perpendicular, the step structure can be formed on the substrate using a simple shape mask. Therefore it is possible to construct the LN modulator more easily. Furthermore, in the transverse direction parallel with the substrate surface, the branching waveguides 13A and 13B can be made close (provided that this is a range where interaction of the branching waveguides 13A and 13B with the propagation light does not occur), and if the distance between the signal electrode 21 and the ground electrode 22 is made short, a desired electro-optic effect can be obtained with the even lower drive voltage.

Next is a description of a second embodiment of the present invention.

Figure 10:
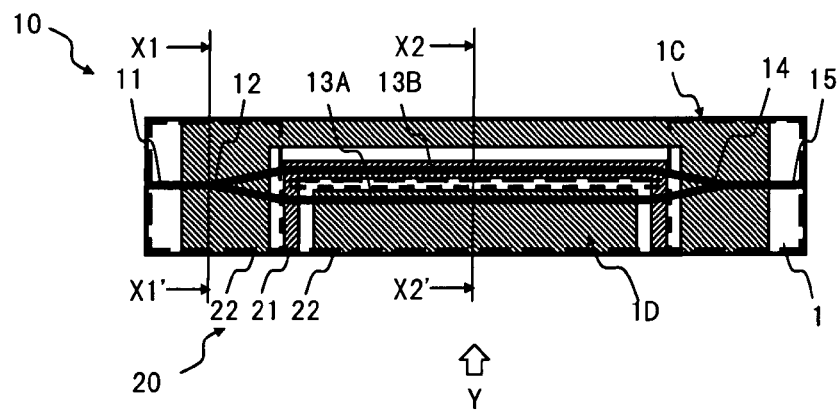
FIG. 10 is a block diagram of a second embodiment of a waveguide-type optical device according to the present invention.
Figure 10:
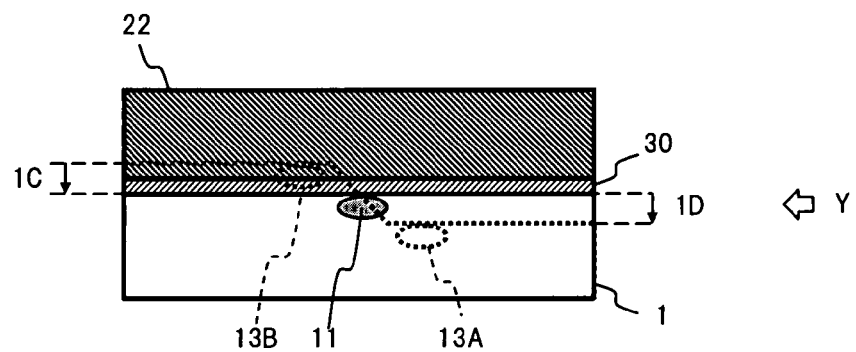
Figure 10:
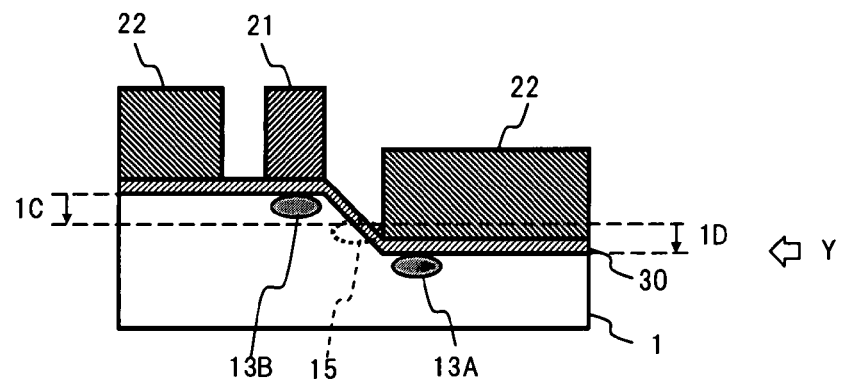

FIG. 10 is block diagram showing a second embodiment of a waveguide-type optical device according to the present invention.

In FIG. 10, the waveguide-type optical device of this embodiment, as an application example of the LN modulator of the abovementioned first embodiment, is one where the fluctuations in the power of the propagation light in the branching waveguides 13A and 12B are more effectively suppressed by providing the step structure and reducing the drive voltage. More specifically, the height of the surface of the LN substrate 1 is made three stages, and with respect to the height of the input waveguide 11 and the output waveguide 15 (refer to the cross-section X1-X1' at the center part of FIG. 10), the height of the branching waveguide 13A is made one stage lower, and the height of the branching waveguide 13B is made one stage higher (refer to the cross-section X2-X2' at the lower part of FIG. 10).

In forming the above described step structure of three stages on the LN substrate 1, at first an etching part 1C is formed on the surface of the LN substrate 1 except for the portion corresponding to the branching waveguide 13B which is arranged at the highest position. Then, in the formed etching part 1C, an etching part 1D is further formed on a portion corresponding to the branching waveguide 13A which is arranged at the lowest position. At this time, it is desirable that the depth of the etching part 1C becomes substantially the same as the depth of the etching part 1D. The depth of whole etching parts 1C and 1D is approximately the same as the depth of the etching part 1A in the abovementioned first embodiment.

Figure 11:
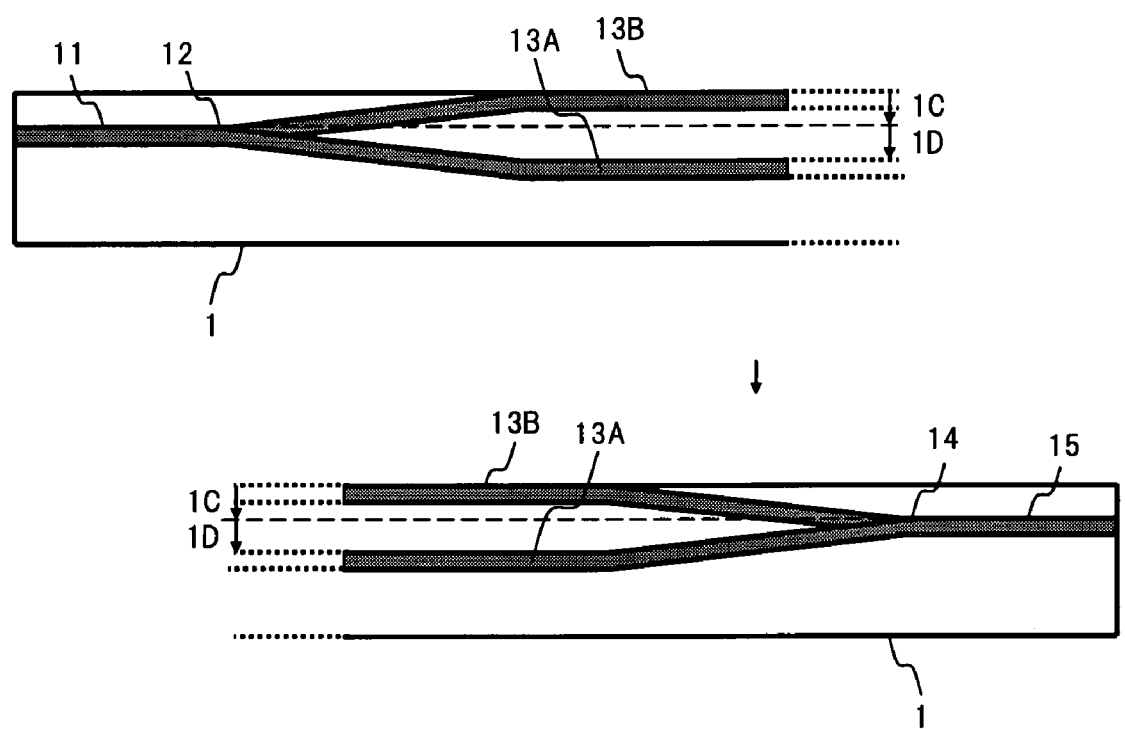
FIG. 11 is a schematic diagram showing an arrangement of optical waveguides, when the configuration of FIG. 10 is seen from the Y-direction.

The portion positioned between the branching part 12 and the one end of the branching waveguides 13A and 13B, and between the other end of the branching waveguides 13A and 13B, and the coupling part 14, is formed with a gentle slope the same as for the case of the abovementioned first embodiment, and the connection of the optical path between the branching part 12 having the difference in level, the branching waveguides 13A and 13B, and the coupling part 14 is performed with a low loss. FIG. 11 is a schematic diagram showing the difference in level of the surface of the substrate 1, when the configuration of FIG. 10 is viewed from the Y-direction following along the optical waveguide. The slope shape of the opposite end portions of the branching waveguides 13A and 13B as described above is shown in an enlarged scale.

In the LN modulator of the above configuration, in addition to obtaining the same operating effect as for the case of the abovementioned first embodiment, in the perpendicular direction of the substrate surface, the branching waveguides 13A and 13B are symmetrically arranged with respect to the height of the input waveguide 11 and the output waveguide 15. Therefore the loss of the light propagated on the branching waveguides 13A and 13B is commensurable. Consequently, the fluctuations in the power of the propagation light of the branching waveguide 13A and 12b by providing the step structure and reducing the drive voltage, can be kept to a minimum.

Next is a description of a third embodiment of the present invention.

Figure 12:
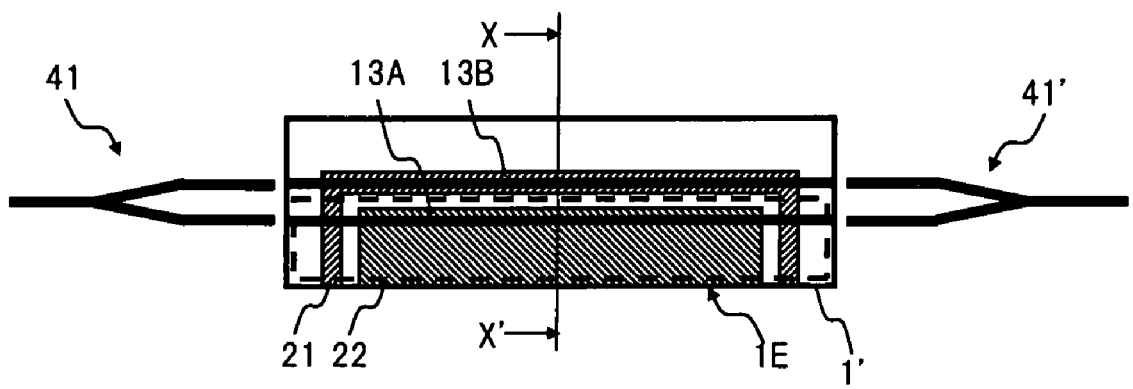
FIG. 12 is a block diagram of a third embodiment of a waveguide-type optical device according to the present invention.
Figure 12:
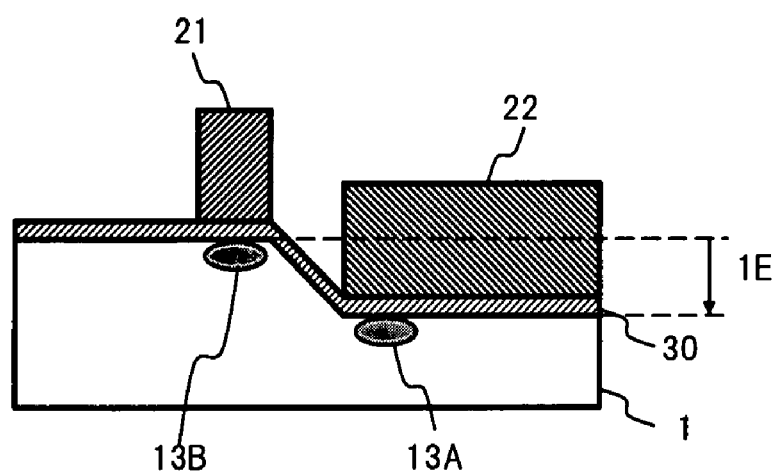

FIG. 12 is a block diagram showing a third embodiment of a waveguide-type optical device according to the present invention.

In FIG. 12, the waveguide device of this embodiment, as a modified example of the LN modulator of the abovementioned first embodiment, is one where the function of the input waveguide 11 and the branching part 12, and the coupling part 14 and the output waveguide 15 formed in the LN substrate 1, is realized using optical fiber type couplers 41 and 41' to thereby simplify the configuration of the waveguide substrate.

More specifically, regarding the LN substrate 1' used in this LN modulator, an etching part 1E is formed on a part of an approximate half on the lower side surrounded by the broken line in the figure. The boundary portion of the etching part 1E, similarly to the case of the aforementioned first embodiment, is formed with an incline in order to prevent cutting of the branching waveguide, similarly to the case of the first embodiment, or is formed substantially perpendicular, as shown in FIG. 9 mentioned above. Opposite ends in the longitudinal direction of the etching part 1E reach as far as the end face of the LN substrate 1', each with a constant depth.

The branching waveguides 13A and 13B are formed near the face having a step of the LN substrate 1 on which the etching part 1E is formed. Here the height of the branching waveguide 13A is one stage lower than the height of the branching waveguide 13B. Opposite ends of the branching waveguides 13A and 13B extend as far as the end face of the LN substrate 1'. A ground electrode 22 is provided above the branching waveguide 13A via a buffer layer 30, and signal electrode 21 is provided above the branching waveguide 13B via the buffer layer 30.

The optical fiber type coupler 41 on the input side has one input port and two branch ports. To the input port is input continuous light applied from the outside. The end face of one branch port is arranged near the input end face of the branching waveguide 13A, and the end face of the other branch port is arranged near the input end face of the branching waveguide 13B.

The optical fiber type coupler 41' on the output side has two input ports, and one coupling port. One input port is arranged near the output end face of the branching waveguide 13A, and the end face of the other input port is arranged near the output end face of the branching waveguide 13B. From the coupling port is output light which is coupled light of the light input to the respective input ports.

In the LN modulator of the above described configuration, in addition to obtaining the same operating effect as for the case of the abovementioned first embodiment, the input/output of light with respect to the branching waveguides 13A and 13B is performed using the optical fiber type couplers 41 and the 41'. Therefore, it is not necessary for the boundary portion positioned on the opposite ends of the etching portion to have a gradual slope shape as with the case of the first embodiment. Hence the step structure of the LN substrate 1 can be simplified, and the waveguide substrate can be easily manufactured.

Figure 13:
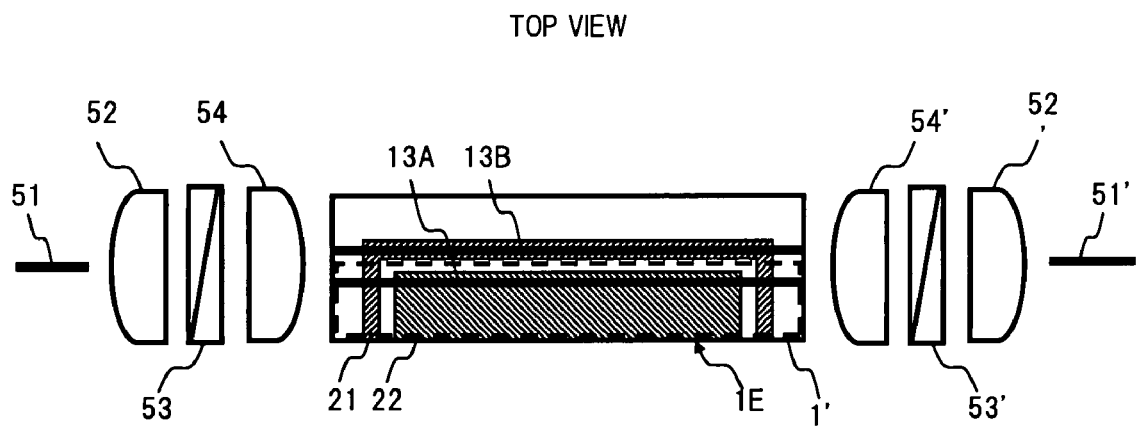
FIG. 13 is a block diagram of another configuration example of the third embodiment.
Figure 14:
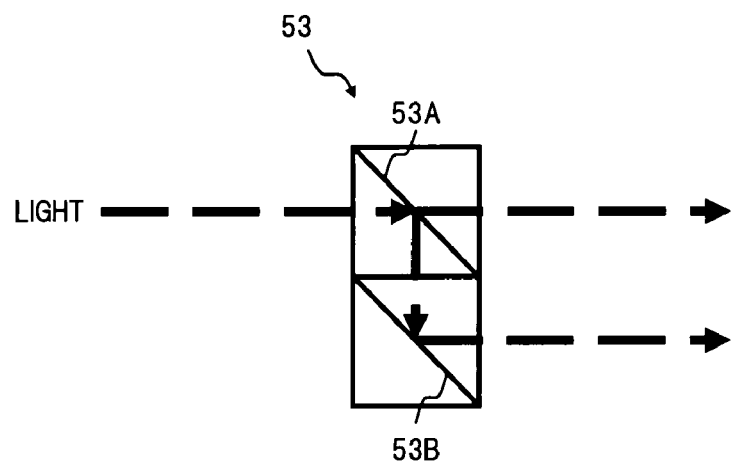
FIG. 14 is a block diagram of a specific example of a prism in the configuration shown in FIG. 13.

In the above third embodiment, the configuration example was shown using the optical fiber type couplers 41 and the 41'. However as shown for example in FIG. 13, the configuration may be such that light outgoing from an input optical fiber 51 is branched into two by a combination of lenses 52 and 54 and a prism 53, and guided to the input end faces of the respective branching waveguides 13A and 13B, and the light outgoing from the output end face of the respective branching waveguides 13A and 13B is combined by a combination of lenses 52' and 54' and a prism 53', and output from an output optical fiber 51'. FIG. 14 is a specific configuration example of the input side prism 53 shown in FIG. 13. In this configuration example, the light outgoing from the input optical fiber 51 is made into parallel light by the lens 52, and this parallel light is branched into two by a half mirror 53A inside the prism 53. The light which has passed through the half mirror 53A is guided through the lens 54 to the input end face of the branching waveguide 13B, and the light which is reflected by the half mirror 53A is again reflected by a total reflection mirror 53B inside the prism 53 and then passes through the lens 54 and is focused onto the input end face of the branching waveguide 13A. The prism 53' on the output side is a similar configuration to the prism 53 on the input side, with the relationship of input and output reversed.

Next is a description of a fourth embodiment of the present invention.

Figure 15:
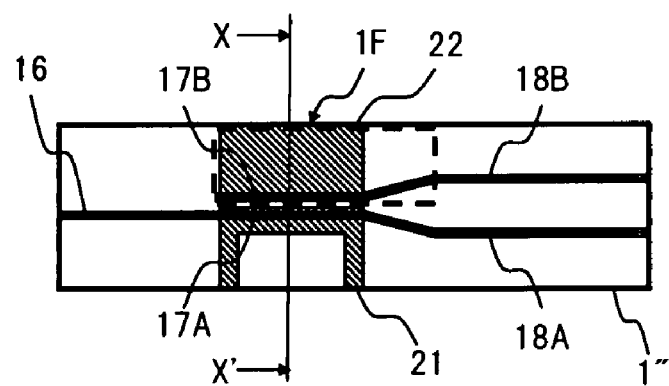
FIG. 15 is a block diagram of a fourth embodiment of a waveguide-type optical device according to the present invention.
Figure 15:
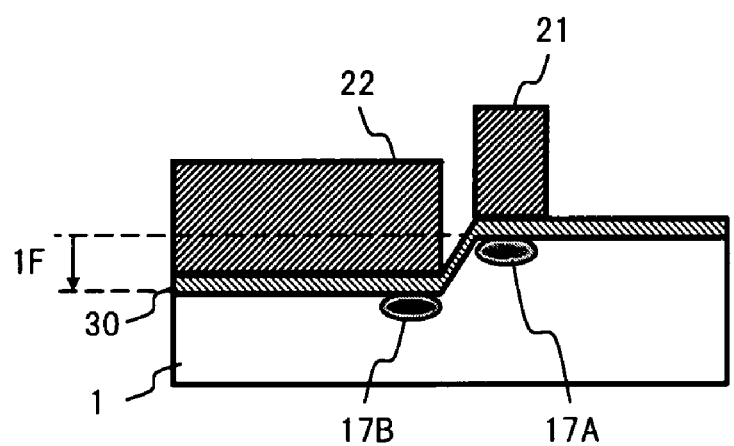
Figure 16:
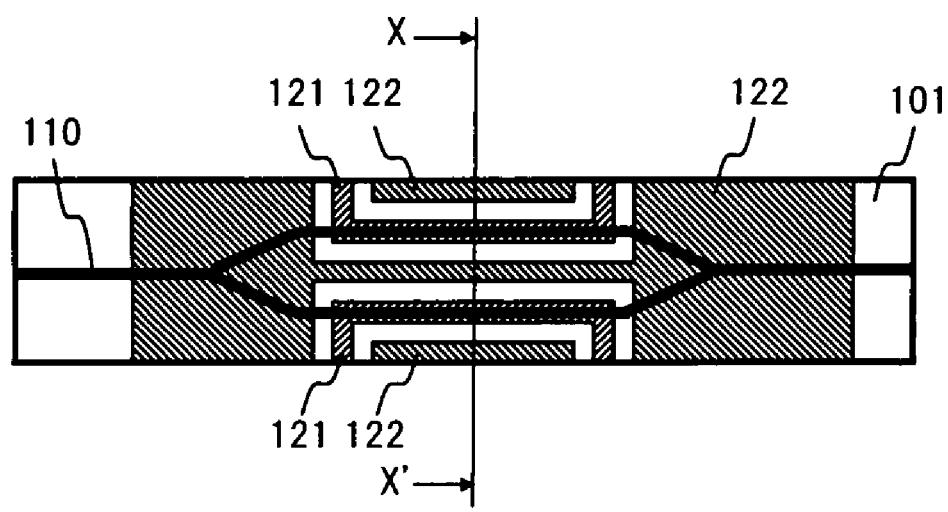
FIG. 16 is a block diagram of a configuration example of a conventional dual-drive type LN modulator.
Figure 16:
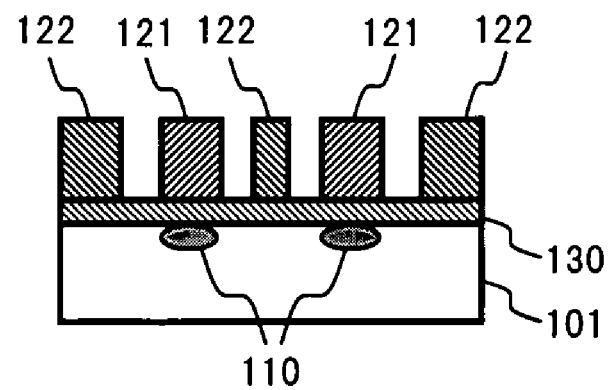
Figure 17:
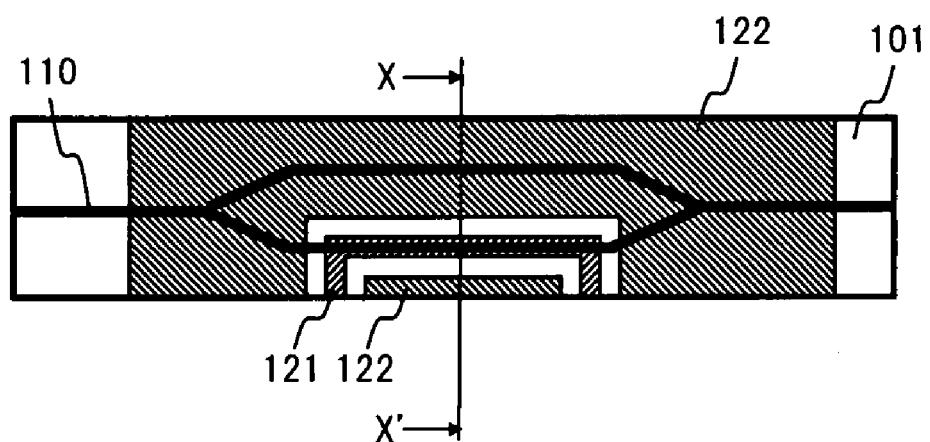
FIG. 17 is a block diagram of a configuration example of a single-drive type LN modulator using a conventional Z-cut substrate.
Figure 17:
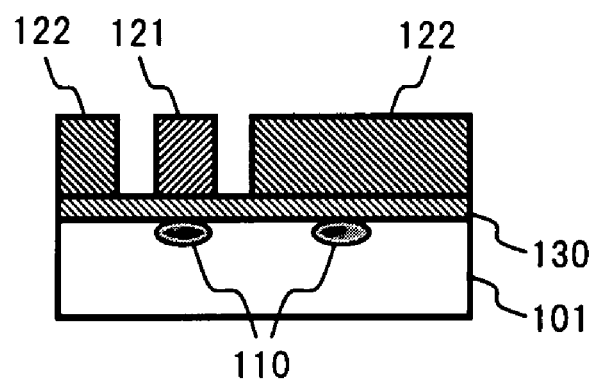
Figure 18:
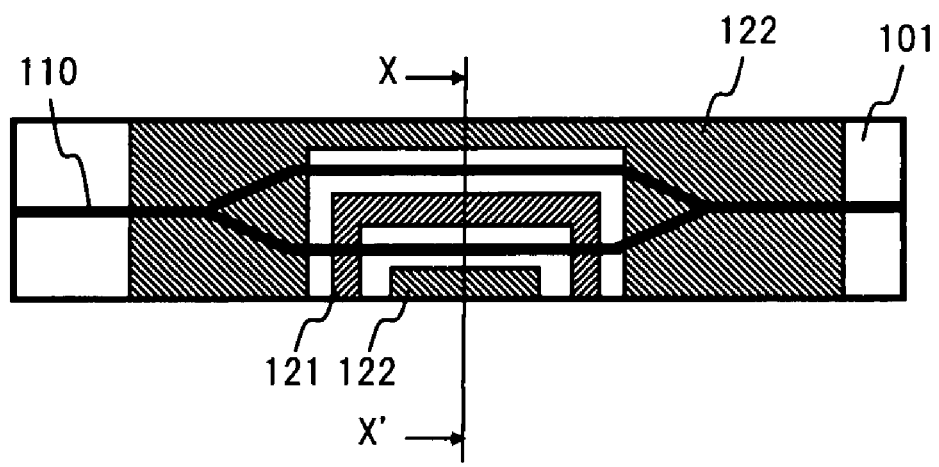
FIG. 18 is a block diagram of a configuration example of a single-drive type LN modulator using a conventional X-cut substrate.
Figure 18:
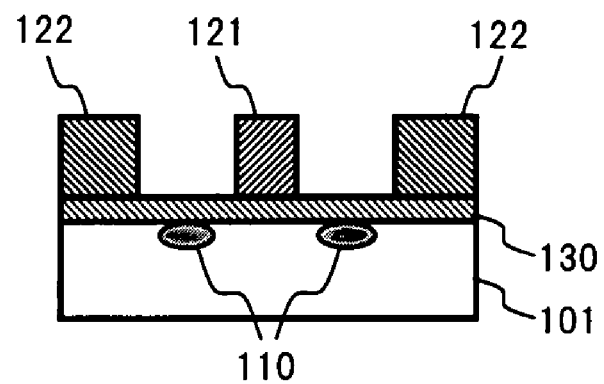

FIG. 15 is a block diagram showing a fourth embodiment of a waveguide-type optical device according to the present invention.

In FIG. 15, the waveguide-type optical device of this embodiment is one where the present invention is applied to a directional coupler type optical switch using a conventional Z-cut substrate. This directional coupler type optical switch comprises; a Z-cut LN substrate 1", an input waveguide 16, parallel waveguides 17A and 17B and output waveguides 18A and 18B, a signal electrode 21 and a ground electrode 22, and a buffer layer 30.

The LN substrate 1" has a etching part 1F in which the height of the substrate surface is made different from the height of other parts, in a preset portion positioned near the parallel waveguide 17B (a range enclosed by the broken line in the top view shown on the upper part of FIG. 15). As shown in the X-X' cross-section shown in the lower part of FIG. 15, the etching part 1F gives a difference in level to the respective parallel waveguides 17A and 17B formed near the surface of the substrate 1". Here, the difference in level is provided so that the height of the parallel waveguide 17B on which the ground electrode 22 is arranged, becomes lower than that of the parallel waveguide 17A on which the signal electrode 21 is arranged. The etching part 1F has a slope shape at one end located on the output side in the longitudinal direction such that the difference in level gradually decreases from the end portion of the parallel waveguide 17B toward a middle part of the output waveguide 18B.

The input waveguide 16, the parallel waveguides 17A and 17B, and the output waveguides 18A and 18B are respectively formed near the surface of the substrate by applying known processing such as titanium (Ti) diffusion with respect to the LN substrate 1" provided with the above etching part 1F. The parallel waveguide 17B has a position (height) one step lower than the other waveguide parts relative to the perpendicular direction of the substrate, due to the etching part 1F of the LN substrate 1". Here the signal electrode 21 is provided above the parallel waveguide 17A via the buffer layer 30, and the ground electrode 22 is provided above the parallel waveguide 17B via the buffer layer 30.

In the directional coupler type optical switch of the above configuration, the optical signal applied from the outside to the input waveguide 16 is sent to the parallel waveguide 17A. On the other hand, the electric field generated between the signal electrode 21 and the ground electrode 22 acts on the pair of parallel waveguides 17A and 17B, corresponding to the control signal applied to one end of the signal electrode 21, and the state of the directional coupling of the light between the parallel waveguides 17A and 17B is controlled by the electro-optic effect due to the electric field. As a result, this acts as an optical switch where the optical signal sent from the input waveguide 16 to the parallel waveguide 17A is guided to either of the output waveguides 18A and 18B.

At this time, the lines of electric force directed from the signal electrode 21 towards the ground electrode 22 become the same state as the aforementioned case shown in FIG. 5, giving a state where the lines of electric force are hardly dispersed, compared to the case of the conventional configuration where the pair of branching waveguides are arranged at the same height.

Consequently, according to this directional coupler type optical switch, the control voltage necessary in order to obtain the desired electro-optic effect can be made lower than with the conventional configuration. Therefore, it is possible to suppress power consumption of the optical switch.

Furthermore, by making the boundary portion on the output side of the etching part 1F a gradual slope shape, the connection between the parallel waveguide 17B and the output waveguide 18B can be performed with low loss. Therefore by providing the etching part 1F and reducing the control voltage, the fluctuations in the power of the optical signal output from the output waveguides 18A and 18B can be suppressed.

In the abovementioned first through fourth embodiments, the configuration example is shown using an LN substrate as the substrate having the electro-optic effect. However, the present invention is not limited to this, and it is possible to apply a known substrate having the electro-optic effect. Moreover, as the waveguide-type optical switch, the example is shown with an LN modulator and a directional coupler type optical switch. However other than this also, the present invention is effective for various types of waveguide-type optical switches which use a Z-cut substrate, with a signal electrode provided above one waveguide of a pair of waveguides, and a ground electrode provided above the other waveguide, and which are furnished with a function for controlling the state of light propagated on the pair of waveguides using the electro-optic effect due to an electric field generated between the signal electrode and the ground electrode.

What is claimed is:

1. A waveguide-type optical device provided with;
   a substrate having an electro-optic effect,
   a first optical waveguide and a second optical waveguide, being a pair of optical waveguides formed on one face of said substrate,
   a first electrode provided above said first optical waveguide, and
   a second electrode provided above said second optical waveguide,
   wherein a distance between an other face of said the substrate opposite to said one face and said first optical waveguide is different from a distance between said other face of said the substrate and said second optical waveguide.

2. A waveguide-type optical device according to claim 1, wherein an electro-optic effect generated corresponding to an electric field between said first and second electrodes is used to control a state of light propagated in said pair of optical waveguides.

3. A waveguide-type optical device according to claim 1, wherein there is provided a Mach-Zehnder optical waveguide formed on said substrate, and
said Mach-Zehnder optical waveguide has an input waveguide, a branching part for branching light input to said input waveguide into two, a first branching waveguide through which one of the lights branched by said branching part propagates, a second branching waveguide through which the other of the lights branched by said branching part propagates, a coupling part which couples respective lights having propagated through said first and second branching waveguides, and an output waveguide through which the light coupled by said coupling part propagates,
wherein said first and second branching waveguides correspond to said pair of optical waveguides.

4. A waveguide-type optical device according to claim 3, wherein
said substrate has a step structure of two stages on a surface, and
in said Mach-Zehnder optical waveguide, said input waveguide, said branching part, said first branching waveguide, said coupling part, and said output waveguide, are formed near a face on an upper stage of said substrate, and said second branching waveguide is formed near a face on a lower stage of said substrate.

5. A waveguide-type optical device according to claim 4, wherein
in the step structure of said substrate, a surface of a boundary portion positioned between said branching part and said second branching waveguide, and a surface of a boundary portion positioned between said second branching waveguide and said coupling part each have a slope shape which continuously joins the face of said upper stage and the face of said lower stage.

6. A waveguide-type optical device according to claim 3, wherein
said substrate has a step structure of three stages on a surface, and
in said Mach-Zehnder optical waveguide, said first branching waveguide is formed near a face on an upper stage of said substrate, and said input waveguide, said branching part, said coupling part, and said output waveguide, are formed near a face on a central stage of said substrate, and said second branching waveguide is formed near a face on a lower stage of said substrate.

7. A waveguide-type optical device according to claim 6, wherein
in the step structure of said substrate, a difference in level between the face on said upper stage and the face on said central stage, and the difference in level between the face on said central stage and the face on said lower stage are substantially the same.

8. A waveguide-type optical device according to claim 6, wherein
in the step structure of said substrate, a surface of a boundary portion positioned between said branching part and said first branching waveguide, and a surface of a boundary portion positioned between said first branching waveguide and said coupling part each have a slope shape which continuously joins the face of said upper stage and the face of said central stage, and a surface of a boundary portion positioned between said branching part and said second branching waveguide, and a surface of a boundary portion positioned between said second branching waveguide and said coupling part each have a slope shape which continuously joins the face of said central stage and the face of said lower stage.

9. A waveguide-type optical device according to claim 1, wherein in said pair of optical waveguides, light outgoing from an input side optical system which uses an optical fiber, is guided to their respective input end faces, and light outgoing from their respective output end faces is guided to an output side optical system which uses an optical fiber.

10. A waveguide-type optical device according to claim 1, wherein there is provided a directional coupler type optical waveguide formed on said substrate, and
said directional coupler type optical waveguide has an input waveguide, first and second output waveguides, and first and second parallel waveguides which send an optical signal input to said input waveguide, to either one of said first and second output waveguides, by using directional coupling between waveguides,
wherein said first and second parallel waveguides correspond to said pair of optical waveguides.

11. A waveguide-type optical device according to claim 1, wherein said substrate uses a Z-cut dielectric crystal.

12. A waveguide-type optical device according to claim 11, wherein said dielectric crystal includes lithium niobate.

13. A waveguide-type optical device provided with;
a substrate having an electro-optic effect,
a first optical waveguide and a second optical waveguide, being a pair of optical waveguides formed on one face of said substrate,
a first electrode provided above said first optical waveguide, and
a second electrode provided above said second optical waveguide,
wherein said first optical waveguide is formed near a first surface which is a part of said one face,
said second optical waveguide is formed near a second surface which is a part of said one face, and
a distance between an other face of said substrate opposite to said one face and said first surface is different from a distance between said other face of said the substrate and said second surface.

14. A waveguide-type optical device according to claim 13, wherein an electro-optic effect generated corresponding to an electric field between said first and second electrodes is used to control a state of light propagated in said pair of optical waveguides.

15. A waveguide-type optical device according to claim 13, wherein
a third surface which connects said first surface and said second surface is inclined with respect to a direction perpendicular to said one face.

16. A waveguide-type optical device according to claim 13, wherein
a third surface which connects said first surface and said second surface is substantially perpendicular to said one face.

* * * * *